(12) United States Patent
Leffler

(10) Patent No.: US 10,406,865 B2
(45) Date of Patent: Sep. 10, 2019

(54) REPAIR BOUNDARY INDICATOR FOR TIRES

(71) Applicant: Steven M. Leffler, St. Charles, IL (US)

(72) Inventor: Steven M. Leffler, St. Charles, IL (US)

( * ) Notice: Subject to any disclaimer, the term of this patent is extended or adjusted under 35 U.S.C. 154(b) by 706 days.

(21) Appl. No.: 14/600,968

(22) Filed: Jan. 20, 2015

(65) Prior Publication Data
US 2016/0207362 A1 Jul. 21, 2016

(51) Int. Cl.
| | |
|---|---|
| *B60C 11/24* | (2006.01) |
| *B60C 19/00* | (2006.01) |
| *B29D 30/06* | (2006.01) |
| *B60C 13/00* | (2006.01) |
| *B60C 11/00* | (2006.01) |
| *B60C 19/12* | (2006.01) |

(52) U.S. Cl.
CPC .............. *B60C 11/24* (2013.01); *B29D 30/06* (2013.01); *B60C 11/00* (2013.01); *B60C 13/001* (2013.01); *B60C 19/00* (2013.01); *B60C 19/12* (2013.01); *B60C 2013/026* (2013.01)

(58) Field of Classification Search
CPC ..... B60C 13/001; B60C 13/004; B60C 11/24; B60C 25/00; B60C 25/005; B60C 25/16; B60C 25/002; B60C 23/06; B60C 23/064; B60C 2019/006; B60C 19/00; B60C 19/12; B60C 19/122; B60C 2013/026; B60C 19/002

USPC .... 152/154.2, 156, 501–507, 510, 516, 521; 156/115
See application file for complete search history.

(56) References Cited

U.S. PATENT DOCUMENTS

| | | | |
|---|---|---|---|
| 1,774,892 A | 9/1930 | Kline | |
| 4,303,380 A | 12/1981 | Frankforter | |
| 4,319,618 A * | 3/1982 | Suzuki | B60B 7/01 152/185 |
| 4,664,168 A | 5/1987 | Hong et al. | |
| 4,720,313 A | 1/1988 | Wegehaupt | |
| 6,494,543 B1 * | 12/2002 | Hashimura | B60B 21/102 152/510 |
| 2012/0216933 A1 | 8/2012 | Ikonomov et al. | |
| 2012/0248825 A1 | 10/2012 | Tamura | |

OTHER PUBLICATIONS

Green Tire Store, Tire Repair, Greentirestore.com. (Year: 2014).*
Tire Rack, Driving Through Tire Blowouts, Tirerack.com. (Year: 2012).*
Karim Nice, How Tires Work, HowStuffWorks, p. 1. (Year: 2014).*
Merriam-Webster, Definition of "Line" (Year: 2013).*
Merriam-Webster, Definition of "Marker". (Year: 2014).*

* cited by examiner

*Primary Examiner* — Robert C Dye
*Assistant Examiner* — Sedef E Paquette
(74) *Attorney, Agent, or Firm* — McAndrews, Held & Malloy, Ltd.

(57) ABSTRACT

A repair boundary indicator for an inflatable tire is disclosed. The repair boundary indicator is located on the interior or the exterior of the tire to indicate the boundary of the area of the tire that can be safely repaired.

15 Claims, 7 Drawing Sheets

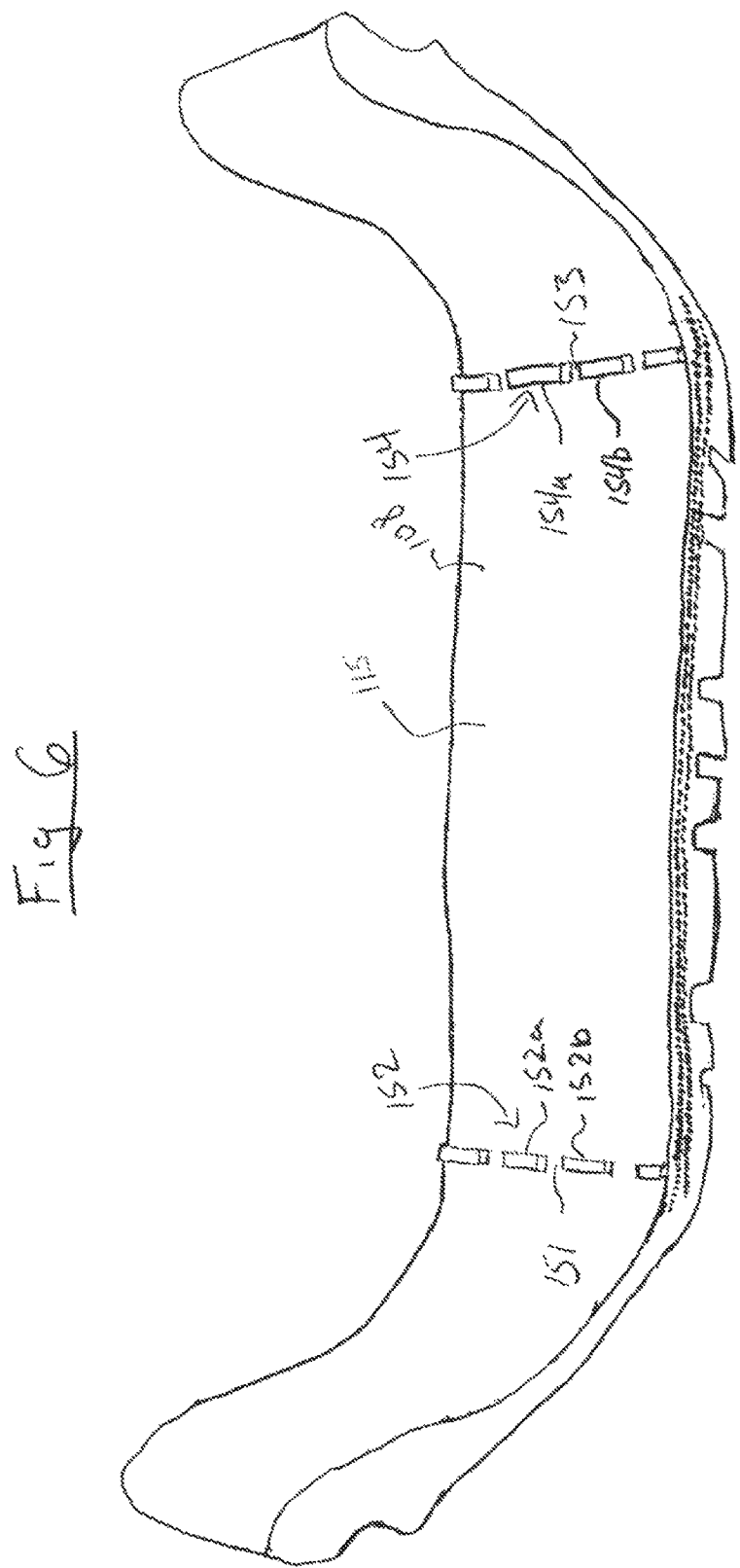

REPAIR BOUNDARY INDICATOR FOR TIRES

FIELD OF THE INVENTION

This invention relates to tires.

BACKGROUND OF THE INVENTION

It is well known that pneumatic steel-belted radial tires are widely used on automobiles, light trucks, and various other vehicles, trailers and machinery. Tires are often punctured by road debris during use. In some cases, the injury to the tire can be repaired and the tire can be put back into service, depending on the size and location of the puncture within the carcass of the tire. If the puncture is too large, or too close to the outer edge of the steel belt inside the tire, the tire should not be repaired, but instead should be scrapped.

The major tire manufacturers of the world have formed an industry trade group called the Rubber Manufacturers Association ("RMA"), through which they have collectively specified guidelines for the safe repair of tires. The RMA guidelines specify that certain punctures that fall between the outermost longitudinal tread grooves of a tire, such as 110 and 112 in FIG. 1, (the "traditional puncture repair area") may be able to be repaired and the tire may be safely put back into service if proper repair procedures are followed. Punctures in the sidewall and adjacent shoulder area of a tire are considered unrepairable under the RMA standards.

If a puncture repair is performed too close to the edge of the steel belts in the tire, the tire may hold air pressure initially, but the damaged steel belt may fail to hold the tire together during the rigors of everyday use when a tire may be exposed to high speeds and extreme centrifugal forces. This may result in a catastrophic failure of the tire, commonly referred to as a blowout. Blowouts are to be avoided due to the possible dangerous consequences that might follow a blowout.

In tire stores across the globe the location of the puncture repair area causes disagreements between the owner of the punctured tire and the tire repair technician. The owners of punctured tires, not wanting to incur the expense of purchasing a new tire, will often request that a repair be attempted on punctures outside the traditional puncture repair area of the tire. Some tire repair technicians follow the guidelines for repair strictly. Some tire repair technicians bend the rules and attempt repairs slightly outside the traditional puncture repair area, guessing and hoping that the repair is not so close to the edge of the steel belt that the tire would fail during use. Others tire repair technicians don't follow the guidelines whatsoever, putting their clients in danger. They either don't care about the puncture repair area, or they don't know any better. Looking at a tire from a layman's perspective, there is no way to know the true boundaries of the puncture repair area of a tire so that it can be safely repaired.

The tire industry guidelines used to define the traditional puncture repair area are imprecise. The location of the outermost longitudinal tread grooves of different tires can vary widely based on the tread pattern of the tire, and may or may not correspond with the true puncture repair area which should be based on the location and engineering of the edge of the steel belts inside the tire. Technicians cannot tell exactly where the edge of the steel belts is located within the tire. Thus, the use of these outside longitudinal tread grooves was employed because it was the only visual markers that ensured that a service technician would not repair a tire with a puncture that was too close to the edge of the steel belts. There exists a need for a more precise manner of determining whether a puncture is located within the part of the tire carcass that can be safely repaired.

The present inventor recognized that a need exists for a repair boundary indicator to indicate which parts of the tire carcass can be safely repaired. The present inventor recognized (1) that any tires have a repairable area that extends beyond the traditional puncture repair area between the outermost longitudinal tread grooves; (2) that the current industry standard method of defining the puncture repair area is imprecise; (3) that many punctured tires are thrown away due to the use of the traditional puncture repair area which is an imprecise proxy for the true puncture repair area, imposing an unnecessary expense on vehicle owners; (4) that many tires with punctures outside the true puncture repair area are repaired and put back into service, putting the tire owner and the general public at risk; and (5) that there is a need for a repair boundary indicator that precisely delineates the exact location of the true puncture repair area and can be easily recognized by tire repair technicians and/or laymen worldwide.

SUMMARY OF THE INVENTION

A repair boundary indicator for a tire is disclosed. One or more repair boundary indicators are located on an interior or an exterior of the tire to indicate the edge of the repairable area of the tire.

In some embodiments, there would be two repair boundary indicators on each tire, each being a linear marking that delineates the outermost edge from the center of a tire that would be repairable.

In some embodiments, the repair boundary indicators are located on an interior wall of the tire.

In some embodiments, the repair boundary indicators are located on an exterior wall of the tire.

In some embodiments, the repair boundary indicators extend circumferentially about the tire.

In some embodiments, the repair boundary indicators are a raised lip, a recess, a marking, or a line.

In some embodiments, the repair boundary indicators extend continuously and circumferentially about the tire.

In some embodiments, the repair boundary indicators extend discontinuously and circumferentially about the tire.

A method of manufacturing a tire is disclosed. One or more repair boundary indicators are placed on the interior or exterior wall of a tire to define a boundary of a repairable area of the tire.

In some embodiments, the step of placing comprises creating two repair boundary indicators the each tire.

In some embodiments, the step of placing comprises forming the repair boundary indicator on the interior or exterior wall of the tire.

In some embodiments, the step of placing comprises forming a raised portion that comprises the repair boundary indicator on the interior or exterior wall of the tire.

In some embodiments, the step of placing comprises forming a recess that comprises the repair boundary indicator on the interior or exterior wall of the tire.

In some embodiments, the step of placing comprises placing a marking comprised of ink, paint, or other similar substance that comprises the repair boundary indicator on the interior or exterior wall of the tire.

In some embodiments, the step of placing comprises placing the repair boundary indicator continuously and circumferentially about the tire on the interior or exterior wall.

In some embodiments, the step of placing comprises placing the repair boundary indicator discontinuously and circumferentially about the tire on the interior or exterior wall.

The features of this invention will become readily apparent from the following detailed description of the invention and the embodiments thereof, from the claims, and from the accompanying drawings.

BRIEF DESCRIPTION OF THE DRAWINGS

FIG. 6 is an upper front prospective section view of a tire having fourth embodiment repair boundary indicators.

DETAILED DESCRIPTION

Figure 1:
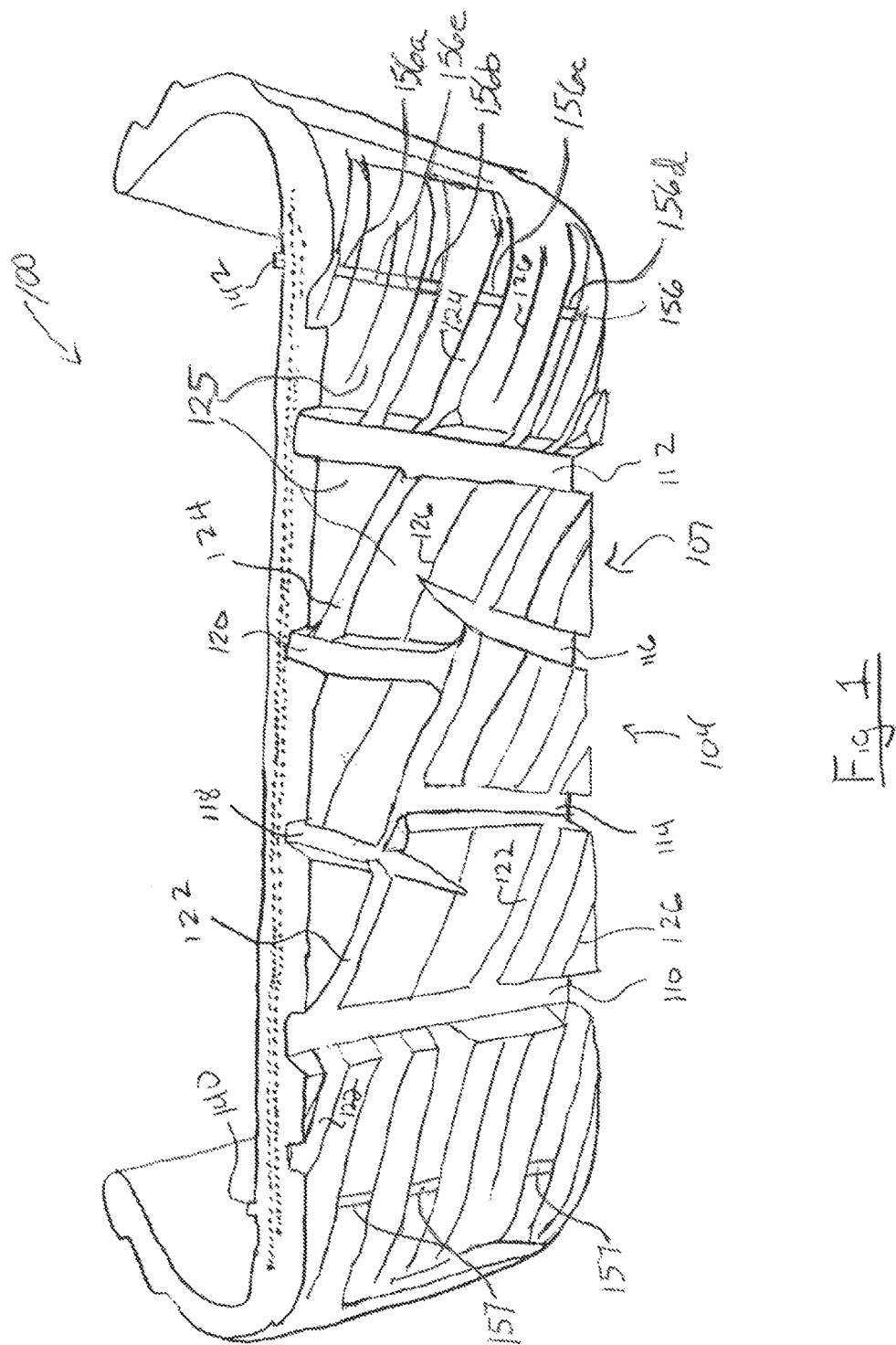
FIG. 1 is a lower front prospective cross-section view of a tire of the present invention.

A tire having a repair boundary indicator is disclosed. The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
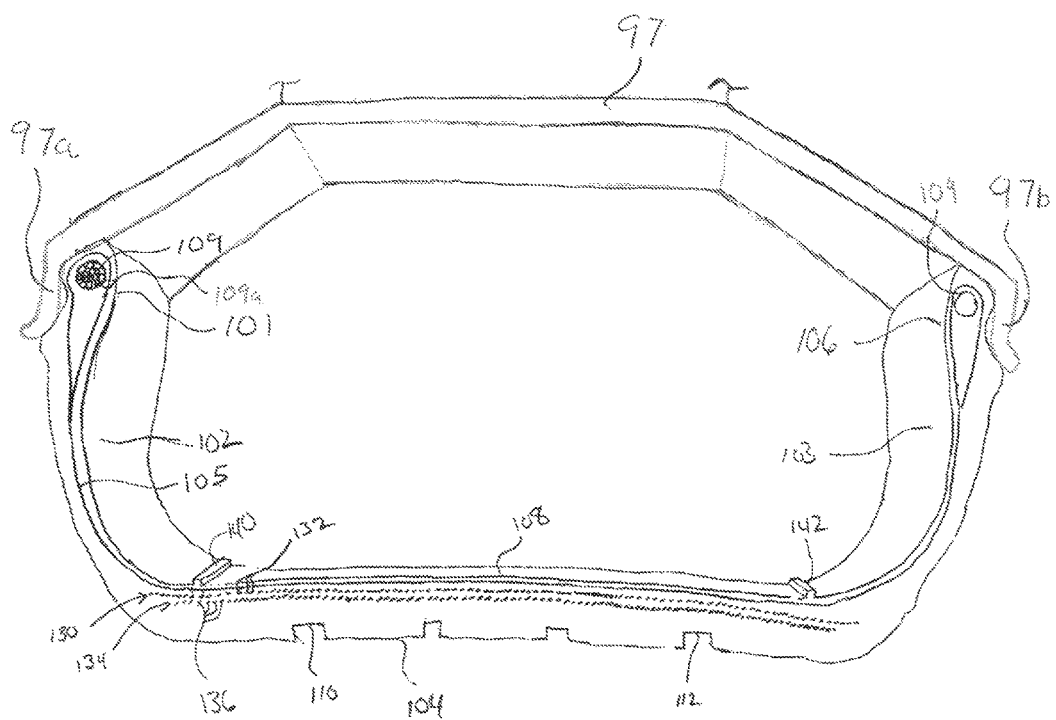
FIG. 2 is a front prospective cross-section view of the tire of FIG. 1 with a cross-section view of a tire rim.
Figure 2A:
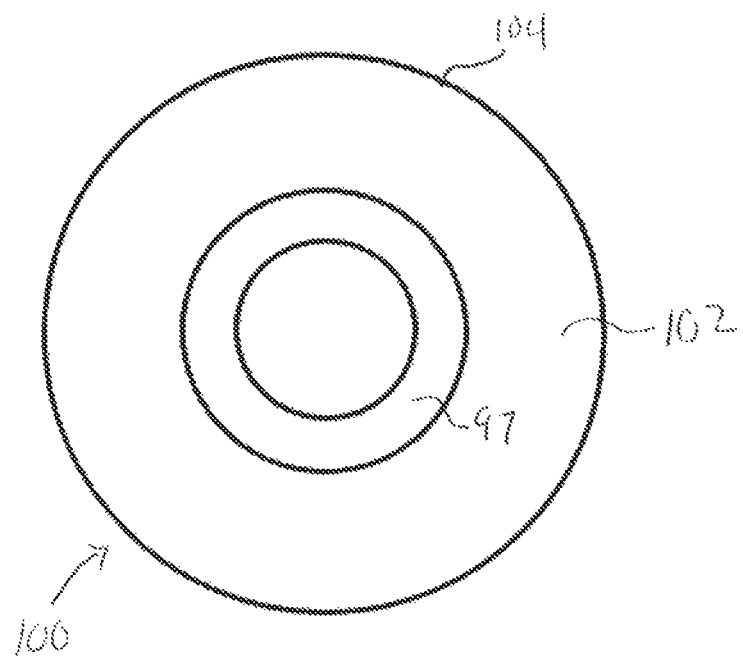
FIG. 2A is a side view of the tire of FIG. 2 with the tire rim of FIG. 2.
Figure 3:
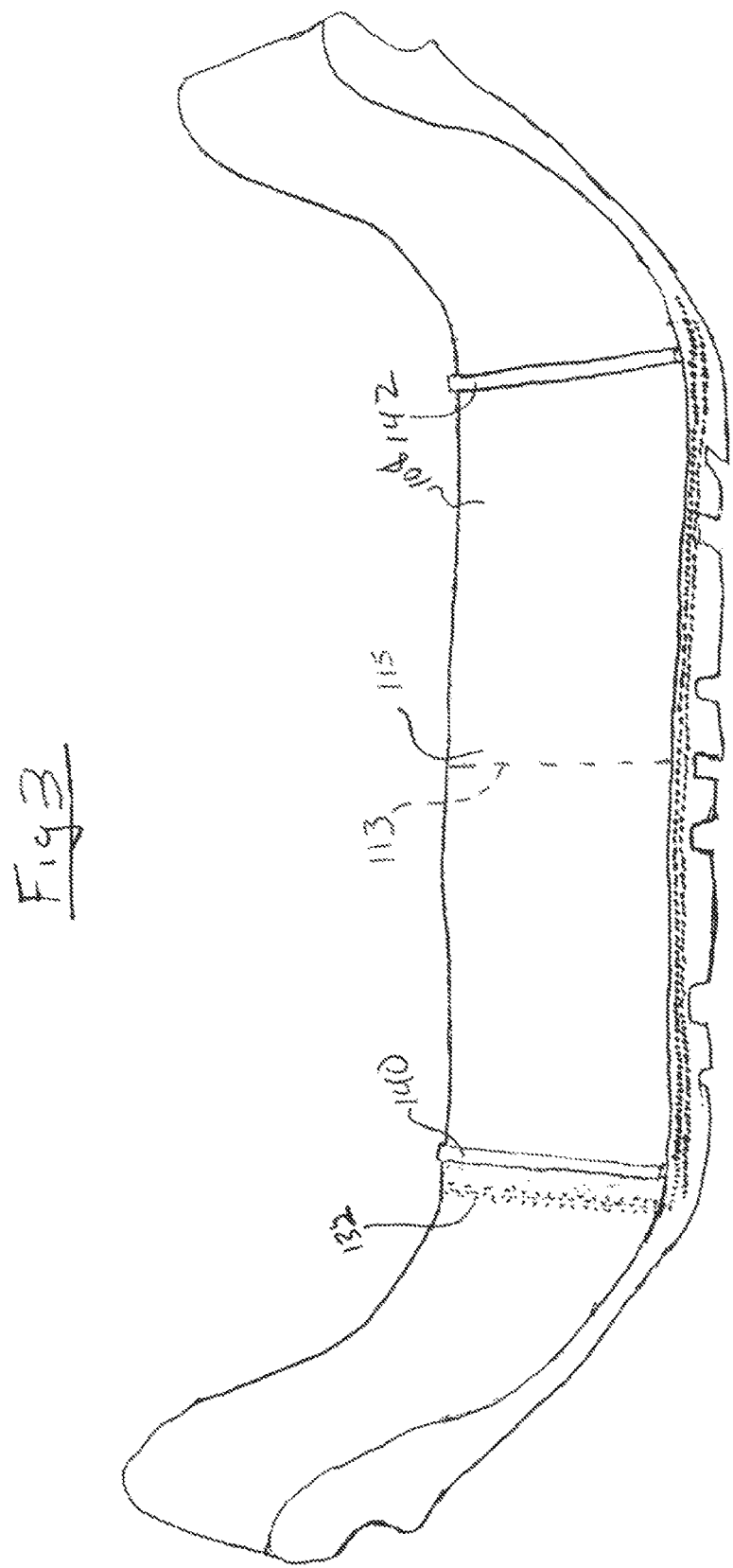
FIG. 3 is an upper front prospective cross-section view of the tire of FIG. 1.

FIGS. 1-3 show a tire 100 having repair boundary indicators 140, 142. In some embodiments, the tire is a radial tire. The tire comprises bead portions 101, a pair of sidewall portions 102, 103, a tread portion 104 extending between the sidewall portions 102, 103, one or more body plies 105 (one ply in the illustrated embodiments) extending between a pair of bead cores 109 embedded in the bead portions 101 to reinforce the portions 101, 102, 103 and 104, and one or more belts 130, 134 reinforcing the tread portion on the outer circumference of the tire. The body plies 105 are rubberized plies of radial cord fabric. In some embodiments the body plies may be comprised of various steel cords, fibrous cords, and mixtures of natural and synthetic rubber. The bead cores 109 are usually built by winding a single strand of steel cord into a round hoop of desired thickness and size. The bead cores 109 are adjacent a rim engaging edge 99 of the sidewall portions 102, 103 respectively.

The tread section 104 comprises a tread pattern 107. The tread pattern 107 comprises numerous grooves extending in various directions, including outside longitudinal grooves 110, 112, interior longitudinal grooves 114, 116, 118, 120, crossways major grooves 122, 124, and crossways minor grooves 126. The grooves create raised tread portions, such as raise tread portions 125, on the tread surface.

Between an inside wall 108 and the tread pattern 107 is the plurality of belts 130, 134 that extend circumferentially about the tire. In some embodiments, the belts are steel belts. Each belt 130,134 comprises a plurality of cords 132, 136 respectively. FIG. 3 shows some of the cords as broken lines as they would extend circumferentially about the interior of the tire, but all of the cords are not shown. Each of the cords 132, 136 in each of the belts respectively are closely spaced next to each other, and are comprised of a layered mesh of woven steel, nylon, specialty rubber, and other materials. The cords may comprise steel, including woven steel. The steel belts extend circumferentially around the tire to keep the tire together at high rotational speed.

The rim engaging edge 99 is for engaging a conventional tire rim. The tire rim 97 encloses the interior of the tire between the sidewalls 102,103, the inside wall 108, and the tire rim so that air or another gas can be applied to the interior of the tire (such as through a valve stem in the tire rim) to inflate the tire. A cross-section portion of a tire rim 97 is shown in FIG. 2. The rim comprises first and second bead locks 97a, 97b at opposite sides of the rim. The first and second bead locks 97a, 97b hold the bead cores 109 and adjacent tire portions to the rim and within first and second bead locks 97a, 97b. The first and second bead locks 97a, 97b prevent the lateral escape of the bead cores 109 from the rim.

The repair boundary indicators 140, 142 provide a visual marker of the boundary between which repairs to the tire can safely be made. Since it is important when repairing a tire to inspect both the outside and inside of the tire for damage, the placement of repair boundary indicators 140, 142 on the interior of the tire will result in them being seen by a service technician. As a further benefit of the placement of the repair boundary indicators on the inside of the tire, no change to the tread area or the exterior of the tire is necessary. Since, it was recommended that any puncture repair include a plug that extends entirely through the tire, the service person carrying out the repair will be able to easily see whether a puncture is in the repairable area 115 between the repair boundary indicators 140, 142.

As is shown in FIG. 2, the repair boundary indicators 140, 140 allow a service technician to know whether a puncture is within the repairable area 115 area. As a result tires with a puncture between the outside longitudinal grooves 110, 120, and the repair boundary indicators will now be known to the service technician to be repairable. This will provide a substantial savings to the customer.

In one embodiment, repair boundary indicators 140, 142 are located about 25 mm inward from the outer most edge of the belts in the shortest belt row, e.g. belt row 134. In some embodiments, the repair boundary indicators are located inward from the outer most edge of the belts. In some embodiments, the repair boundary indicators are located inward from the second or third outer most edge of the belts. In some embodiments, the repair boundary indicators are located inward from the second or third outer most edge of the belts in the shortest belt. The exact location of the repair boundary indicator can vary depending on the type of tire and the true puncture repair area of that tire in which the repair boundary indicator is employed. In some embodiments, in manufacturing, the placement of the repair boundary indicator may be measured from a centerline 113, which may or may not be visibility shown on the interior or exterior surface of the tire. Therefore the location of the repair boundary indicator on the tire may be represented by a measurement from the centerline 113 even if other factors were initially used to determine the proper location of the repair boundary indicator.

The repair boundary indicator can be provided on any type of tire. As not every tire has the same repairable area, the position of the repair boundary indicators can be set by the tire manufacturer who is able to specify the safe repairable boundary for the corresponding tire.

FIG. 3 shows the repair boundary indicators are raised above the interior surface 108 of the tire to create a lip or ridge. However, any mark or variation that is visually perceptible could be used as a repair boundary indicator. In some embodiments, the repair boundary indicator may comprise one or more of words, symbols, projections, protrusions, and/or recesses. The repair boundary indicators may extend continuously or intermittently along the repair boundary.

Figure 4:
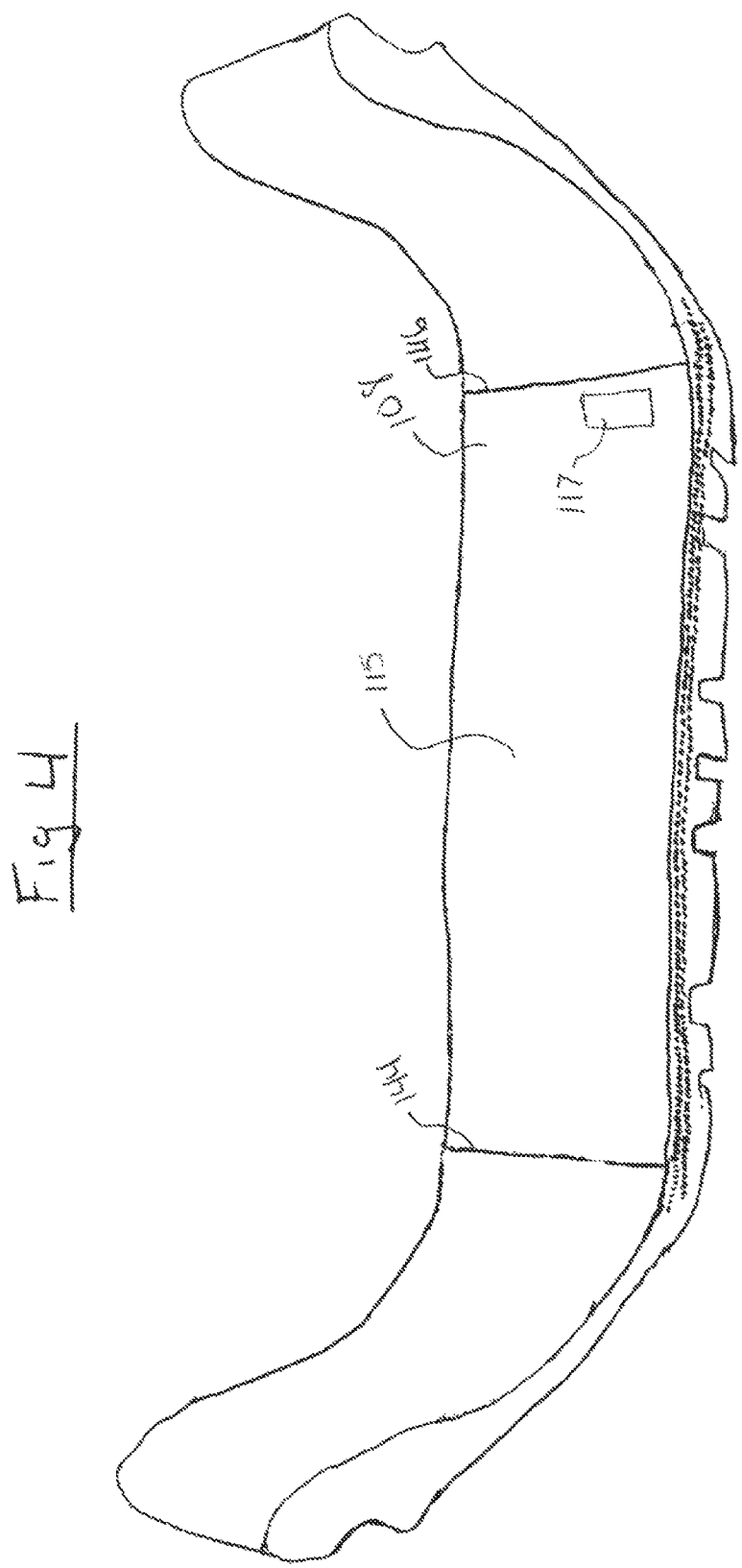
FIG. 4 is an upper front prospective cross-section view of a tire having second embodiment repair boundary indicators.

FIG. 4 shows a tire having second embodiment repair boundary indicators 144, 146 that are lines drawn or painted on the interior surface 108 of the tire. The lines may be drawn with any material or substance that is capable of being visually perceptible on the interior surface, such as ink or paint. Additionally, the various diagrams, instructions, and/or warnings for proper repair written in one or more languages could be painted or molded into the tire. Such markings could be on the inside or outside of the tire, could be cosmetic in nature, and would not be meant to affect the performance or operation of the new tire. In some embodiments, the diagrams, instructions, and/or warnings, 117, can be located at or adjacent to the repair boundary indicator. In some embodiments, the diagrams, instructions, and/or warnings are or comprise the repair boundary indicator. The diagrams, instructions, and/or warnings may be repeated about the tire along the repair boundary. The instructions or warnings may be in one continuous or discontinuous sentence extending about the tire and the words of the instructions or warnings are the repair boundary indictor. For example, the repair boundary indicator could be the words REPAIR BOUNDARY REPAIR BOUNDARY REPAIR BOUNDARY, etc. in such repeating manner, and which extend along the lines shown as 144, 146 in FIG. 4, whether or not the lines 144, 146 were actually shown on the tire.

Figure 5:
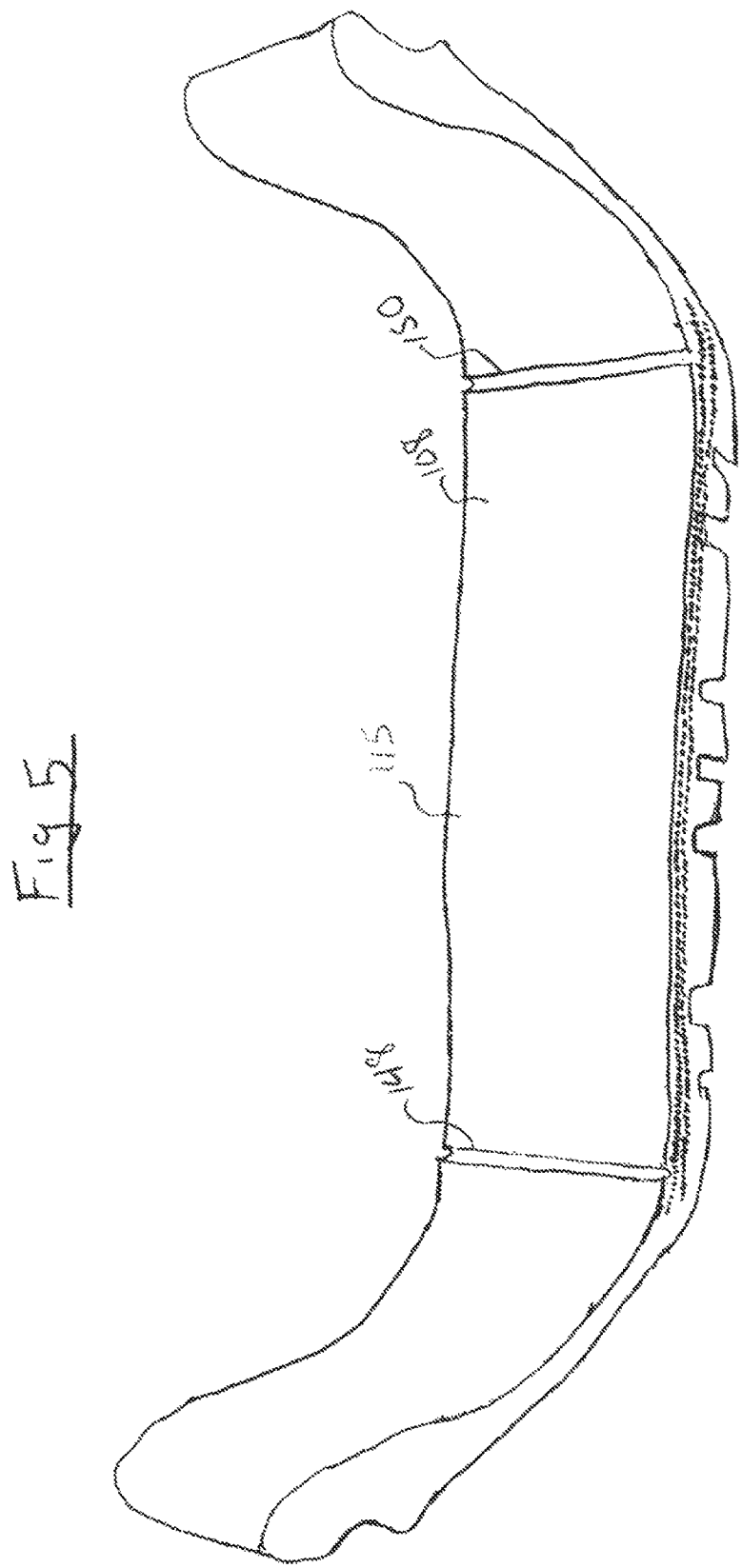
FIG. 5 is an upper front prospective section view of a tire having third embodiment repair boundary indicators.

FIG. 5 shows a tire having third embodiment repair boundary indicators that are recesses, valleys, or grooves. The valleys may have any desired width. In one embodiment, the grooves are molded directly onto the interior surface 108. In some embodiments, the grooves have a narrow width so as to be a line.

FIG. 6 shows a tire having fourth embodiment repair boundary indicators that comprise a discontinuous raised lip 152, 154. Each discontinuous raised lip 152, 154 comprises a number of raised lip portions, 152a, 150b, 154a, 154b, respectively. Each raised lip portion 152a, 150b, 154a, 154b is separated by gaps 151, 153, respectively. The length of the lip portions can vary. The lip portions may be spaced apart any desired distance. Any of the other disclosed embodiment repair boundary indicators 140, 142, 144, 146, 148, 150 may also be discontinuous.

In some embodiments, the repair boundary indicators are located on the exterior of the tire. A right side repair boundary indicator 156 is shown at 156a, 156b, 156c, 156d in FIG. 1. A left side repair boundary indicator 157 is shown in FIG. 1. While FIG. 1 shows repair boundary indicators 140, 142 on the interior and a marker 156 on the exterior, it will be recognized that repair boundary indicators can be provided on only the interior, only the exterior, or both the interior and exterior. The repairable area of the tire extends between the right and left side repair boundary indicators. As the left side repair boundary indicator is substantially the same as the right side repair boundary indicator, only the right side will be described.

In some embodiments, when the right and left side repair boundary indicators are located within the tread grooves, the radial location of each segment of the repair boundary indicator within the respective tread groove will depend on the intersection of the repair boundary indicator with the tread groove. So the segments of each repair boundary indicator within tread grooves may not be mirror image identical with the opposite repair boundary indicator about the centerline 113, even though the repair boundary indicators space apart equidistant from the centerline 113 on opposite sides of the centerline. However, this will depend on the tread pattern and the location of the tread grooves on each of the centerline 113 on the tread surface. Therefore, in some embodiments, the left and right repair boundary indicators will be mirror image identical about the centerline. In some embodiments, the repair boundary indicator extends radially about the tire on the exterior surface.

When the repair boundary indicator 156 is drawn or painted on the exterior of the tire, the use of the tire may wear the repair boundary indicator off of the raised tread portion that will come in contact with the road or other surface, however the repair boundary indicator will remain on the portion of the grooves that are recessed from the raised tread portion. Therefore repair boundary indicator 156 is shown as intermittent portions 156a, 156b, 156c, 156d found in the recessed portions of existing tread groves in such portions that intersect the repair boundary indicator. The intermittent portions 156a, 156b, 156c, 156d should not be worn off because they are not in regular contact with the road or other abrasive surface.

In some embodiments, the exterior repair boundary indicator 156 is a raised portion that is raised from the floor and/or sidewall of the interior of the tread groove, such as tread groove 124. The repair boundary indicator is not raised above the raised portion of the tread that comes in contact with the road. Therefore it will not wear off by regular contact with the road or other abrasive surface, at least not until all the tread is worn completely down and the tire is bald. But worn bald tires generally should not be utilized or repaired.

In some embodiments, the exterior repair boundary indicator 156 is a recessed portion that is recessed from the floor and/or sidewall of the interior of the tread groove.

In some embodiments, one or more portions 156e of the repair boundary indicator 156 is located on or above the tread surface 104. Such portion could be worn off over time, however, the portions that are located in the tread grooves, such as portions 156a, 156b, 156c, 156d, should remain as described above.

Any embodiment of the repair boundary indicator shown or described herein on the interior surface 108 could be provided on the exterior tread portion/surface 104 of the tire and any embodiment of the repair boundary indicator shown or described herein on the exterior tread portion/surface 104 of the tire can be provided on the interior surface 108.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A pneumatic steel-belted radial tire comprising:
a plurality of steel belts extending circumferentially around the tire, wherein the plurality of steel belts has a width; and
repair boundary indicators visibly located on an interior surface of the tire that delineate the outermost boundaries for repairing a puncture through the tire, wherein:
the repair boundary indicators are located inwardly from the outer edges of the plurality of steel belts such that the distance between the repair boundary indicators is less than the width of the plurality of steel belts; and
the repair boundary indicators comprise ink, paint, ridges, or grooves.

2. The tire of claim 1, wherein the repair boundary indicators are two visible lines running circumferentially about the interior surface of the tire.

3. The tire of claim 1, wherein the repair boundary indicators comprise a plurality of lines on the interior surface.

4. The tire of claim 1, wherein the repair boundary indicators extend continuously and circumferentially about the tire on the interior surface.

5. The tire of claim 1, wherein the repair boundary indicators extend discontinuously and circumferentially about the tire on the interior surface.

6. A pneumatic steel-belted radial tire comprising:
two sidewalls, each sidewall comprises a bead core adjacent a rim engaging edge;
a circumferential wall joined with and between the two sidewalls, the circumferential wall and the two sidewalls each comprising rubber;
the circumferential wall comprising an exterior tread surface, an interior surface opposite the exterior tread surface, and a plurality of steel belts interposed between the exterior tread surface and the interior surface, wherein the plurality of steel belts comprises a width; and
a plurality of repair boundary indicators visibly located on the interior surface of the tire that delineate the outermost boundaries for repairing a puncture through the tire, wherein:
the plurality of repair boundary indicators are located inwardly from the outer edges of the plurality of steel belts such that the distance between the plurality of repair boundary indicators is less than the width of the plurality of steel belts; and
the repair boundary indicators comprise ink, paint, ridges, or grooves.

7. The tire of claim 6, wherein the repair boundary indicators provide a visual marker of the boundary between which repairs to the tire can safely be made.

8. The tire of claim 6, wherein the repair boundary indicators are useable to determine whether it is safe to repair a tire.

9. The tire of claim 6, wherein the repair boundary indicators help to differentiate which portion of the tire is safe to repair and which portion is not safe to repair.

10. A pneumatic steel-belted radial tire comprising:
two sidewalls, each sidewall comprises a bead core adjacent a rim engaging edge;
a circumferential wall joined with and between the two sidewalls, the circumferential wall and the two sidewalls each comprising rubber;
the circumferential wall comprising an exterior tread surface, an interior surface opposite the exterior tread surface, the circumferential wall comprising at least one belt, the at least one belt comprising a plurality of cords, the rim engaging edge of the each sidewall located opposite the circumferential wall, wherein the at least one belt comprises a steel belt;
one or more body plies extending between bead cores of each sidewall; and
first and second repair boundary indicators visibly located on the interior surface and delineating a boundary of a repairable area of the tire along the circumferential wall between the sidewalls, wherein:
a distance between the first and second repair boundary indicators is less than a width of the at least one belt; and
the first and second repair boundary indicators comprise ink, paint, ridges, or grooves.

11. The tire of claim 10, wherein each of the first and second repair boundary indicators extends circumferentially about the tire on the interior surface.

12. The tire of claim 10, wherein each of the first and second repair boundary indicators comprises a marking on the interior surface.

13. The tire of claim 10, wherein each of the first and second repair boundary indicators differentiates a safe area and not a safe area to repair.

14. The tire of claim 10, wherein each of the first and second repair boundary indicators comprises a line on the interior surface.

15. The tire of claim 10, wherein each of the first and second repair boundary indicators extends continuously and circumferentially about the tire on the interior surface.

* * * * *